United States Patent Office 2,810,675
Patented Oct. 22, 1957

2,810,675

PROCESS FOR CONTROLLING FLIES EMPLOYING N - TERT - OCTYL - N - CYANO - METHYL CYANAMIDE

Peter L. de Benneville and Lawrence J. Exner, Philadelphia, Pa., assignors to Rohm & Haas Company, Philadelphia, Pa., a corporation of Delaware No Drawing. Application August 28, 1953,
Serial No. 377,234

1 Claim. (Cl. 167—22)

This invention concerns cyanamides of the structure $$R-N-CH_2CN$$
$$\phantom{R-N-}|$$
$$\phantom{R-N-}CN$$

wherein R is a branch-chained alkyl group of seven to nine carbon atoms, particularly a tertiary octyl group of the composition $(CH_3)_3CCH_2C(CH_3)_2-$. These compounds are distinguished by their marked insecticidal activity. The invention also relates to a process for preparing the above compounds and to the process of controlling insects by applying thereto a compound of this invention.

Simple alkyl cyanomethyl cyanamides such as $$CH_3N(CN)CH_2CN$$

were prepared by von Braun by heating $$(CH_3)_2N(Br)(CN)CH_2CN$$

with evolution of methyl bromide. The lower alkyl cyanomethyl cyanamides, however, are deficient in the insecticidal activity required for practical use. This is also true of n-alkyl homologues higher than those known heretofore. Strange to say, the branched-chained alkyl cyanomethyl cyanamides, when the alkyl groups contain seven to nine carbon atoms are markedly effective insecticidal agents. They are also distinguished by having better stability than the straight chain isomers.

Alkyl cyanomethyl cyanamides may be prepared by starting with a primary alkylamine, formaldehyde, and hydrogen cyanide to form an aminoacetonitrile, $$RNHCH_2CN$$

and reacting this nitrile with cyanogen chloride or cyanogen bromide in the presence of an acceptor for hydrogen halide. If an aminonitrile of the proper size and configuration is available, it may, of course, be reacted directly with cyanogen chloride or bromide.

Branch-chained primary amines which are suitable include tert.-heptylamine, tert.-octylamine, tert.-nonylamine, 2-ethylhexylamine, 3,5,5-trimethylhexylamine, and the like. One of these or a mixture thereof is treated in solution in alcohol and water with formaldehyde. This mixture is reacted with hydrogen cyanide. These reactions may be carried out between 0° and 50° C. If desired, hydrogen cyanide may be first added to formaldehyde, whereby glycolonitrile is formed. Aqueous solution of 50–70% glycolonitrile and alkylamine are then mixed. Temperatures of 15° to 35° C. are suitable for reacting these materials. After a short reaction period water is separated to leave crude alkylaminoacetonitrile. This may be used as obtained or it may be first purified by distillation. To the same end alkylamine and hydrogen cyanide may first be mixed and then formaldehyde added.

The alkylaminoacetonitrile is treated with cyanogen halide in the presence of an acceptor for hydrogen halide. An inorganic base, such as sodium carbonate, sodium hydroxide, potassium carbonate or bicarbonate, potassium hydroxide, calcium hydroxide, or the like may be conveniently used. There may also be used an organic base. For this purpose there may be used an excess of the aminonitrile, which is recoverable. The reaction is best done in an inert organic solvent, such as naphtha, benzene, or toluene. Temperatures between 0° and 75° C. are generally used. The reaction products are often useful in the form in which they are obtained after separation of salt and excess acceptor and removal of water and solvent. They may be purified by distillation under reduced pressure or by other conventional steps, including crystallization and extraction.

Further details are presented in the following illustrative examples, wherein parts are by weight unless otherwise specified.

EXAMPLE 1

(a) A mixture was made of 455 parts of 2,4,4-trimethyl-2-aminopentane, 350 parts of water, and 280 parts of ethanol. Thereto was added with stirring and cooling to hold the temperature at 15°–20° C. 288 parts of aqueous 36.5% formaldehyde solution over a period of 45 minutes. To the resulting mixture at 15°–18° C. there was added over 1.5 hours 94.5 parts of anhydrous hydrogen cyanide. The reaction mixture was stirred for four hours and allowed to separate into layers. The aqueous layer was withdrawn. The organic layer was distilled. After a small forerun a main fraction of 533 parts was taken off at 99°–102° C./4 mm. It contained by analysis 16.4% of nitrogen and corresponded in composition to N-2-(2,4,4-trimethylpentyl)aminoacetonitrile, the theoretical nitrogen content of which is 16.7%.

(b) To a solution of 68 parts of cyanogen chloride in 40 parts of benzene was slowly added with stirring and cooling to maintain the temperature between 5° and 35° C. 168 parts of the above aminonitrile dissolved in 80 parts of benzene. To this mixture there was then added over a period of 35 minutes a solution of 69 parts of anhydrous potassium carbonate in 100 parts of water with the temperature being held at 25°–35° C. Stirring was continued with the temperature at 20° C. for an hour and at 50° C. for about 20 minutes. This mixture was filtered and the organic layer was separated. Benzene was distilled therefrom under reduced pressure. The residue was distilled at low pressure. After removal of unreacted aminonitrile there was collected at 131°–134° C./0.65 mm. a fraction of 128 parts of a pale yellow oil. It contained 21.6% of nitrogen and corresponded in composition to N-(2,4,4-trimethylpentyl)-N-cyanomethyl cyanamide, for which the theoretical nitrogen content is 21.8%. As this oil stood, it solidified. It was recrystallized from ethanol at Dry Ice temperatures to yield a colorless crystalline product melting at 34.5°–35° C.

EXAMPLE 2

(a) To 193 parts of 2-ethylhexylamine there was added over a 20 minute period 124 parts of aqueous 36.5% formaldehyde solution while the temperature was held at 25°–35° C. There was then added during the course of 20 minutes 40.5 parts of liquid hydrogen cyanide with the temperature at 20°–25° C. The mixture was stirred for 1.5 hours. Layers were allowed to form and were separated. The organic layer was distilled. At 99°–101° C./1.5 mm. a fraction was collected consisting of N-2-ethylhexylaminoacetonitrile.

(b) The method described in Example 1 (b) was applied to 50 parts of this 2-ethylhexylaminoacetonitrile, this being reacted with 18.5 parts of cyanogen chloride in the presence of 20.7 parts of potassium carbonate. The products was distilled at 144°–145° C./1 mm. as a pale yellow oil containing 21.1% of nitrogen. It was N-2-ethylhexyl-N-cyanomethyl cyanamide.

Repetition of the above procedure with an equivalent weight of cyanogen bromide leads to the identical end product.

EXAMPLE 3

(a) Hydrogen cyanide and formaldehyde were reacted in the presence of a small amount of triethanolamine as catalyst, forming glycolonitrile, and 46 parts of a 70% solution of this compound were treated at 40° C. with 73.2 parts of n-octylamine. The reaction was worked up as before to give N-n-octylaminoacetonitrile, distilling at 120°–125° C./2 mm.

(b) By the method used above 49 parts of this aminonitrile and 19.7 parts of cyanogen chloride with 20.2 parts of potassium carbonate were reacted to give 26 parts of N-n-octyl-N-cyanomethyl cyanamide, distilling at 154–165° C./1.5 mm. and containing by analysis 21.7% of nitrogen (theory 21.7%).

EXAMPLE 4

(a) There were reacted 143 parts of 3,5,5-trimethylhexylamine, 125 parts of aqueous 37% formaldehyde solution, and 35 parts of hydrogen cyanide at about 25° C. by the method described in Example 2 (a). The distillate of product amounted to 134 parts of N-3,5,5-trimethylhexylaminoacetonitrile, coming over at 92° C./0.6 mm.

(b) There are mixed 55 parts of this aminonitrile, 20 parts of toluene, 16 parts of water, and 21 parts of potassium carbonate. To this mixture there was slowly added at 20°–30° C. with stirring a solution of 18.4 parts of cyanogen chloride in 73 parts of toluene. This mixture was stirred for five hours. It was filtered. The organic layer was distilled to give 51 parts of N-3,5,5-trimethylhexyl-N-cyanomethyl cyanamide, coming over at 141–149° C./1 mm. It contained by analysis 19.8% of nitrogen (theory 20.3%).

EXAMPLE 5

(a) To a suspension of 174 parts of a tert.-nonylamine having the nitrogen bound to a tertiary carbon atom of the alkyl group in 220 parts of water at about 10° C. there was added 99.5 parts of aqueous 36% formaldehyde solution and then 32.4 parts of anhydrous hydrogen cyanide. The mixture was stirred for four hours and separated. The oil layer was distilled. At 110°–118° C./3.5 mm. there was obtained a fraction of 175 parts of N-tert.-nonylaminoacetonitrile. By analysis it contained 15.1% of nitrogen (theory 15.4%).

(b) To 147 parts of this aminonitrile in 80 parts of toluene there was added a solution of 24.5 parts of cyanogen chloride in 117 parts of toluene. The temperature was kept below 15° C. during this addition, which required about an hour. The reaction mixture was left standing for 16 hours. Crystalline nonylaminoacetonitrile hydrochloride was filtered off and was washed with toluene. The toluene solution was just neutralized with a 2-N hydrochloric acid solution. The water layer was removed and the organic layer was stripped under reduced pressure to yield a brown oil. This corresponded fairly closely in composition to tert.-nonylcyanomethyl cyanamide. This nonyl group is of highly branched structure, being obtained originally from polypropylenes.

EXAMPLE 6

In the same way tert.-heptylamine was reacted with formaldehyde and hydrogen cyanide to form N-tert.-heptylaminoacetonitrile, which was in turn reacted in toluene with cyanogen chloride. The product was separated as a residual oil which corresponded in composition to N-tert.-heptyl-N-cyanomethyl cyanamide. It contained by analysis 23.2% of nitrogen (theory 23.4%).

In the same way other N-alkyl-N-cyanomethyl cyanamides were formed, including n-butyl and tert.-butyl. Also the corresponding N-cyclohexyl compound was made.

These various cyanamides were evaluated as insecticides by standard test procedures. In one set of tests these compounds were taken up in an aromatic solvent and about 5% of a non-ionic emulsifier was added to form emulsifiable concentrates. Against black bean aphids at 1:400 N-tert.-octyl-N-cyanomethyl cyanamide gave a 95% kill; N-3,5,5-trimethylhexyl-N-cyanomethyl cyanamide gave a 97% kill; tert.-nonyl-N-cyanomethyl cyanamide gave a 94% kill; and N-n-butyl-N-cyanomethyl cyanamide gave at 33% kill, a value too low to be of practical significance. Against read spiders (at 1:400) N-3,5,5-trimethylhexyl-N-cyanomethyl cyanamide gave a 93% kill, while the n-butyl compound gave no kill. Likewise, N-methyl-N-cyanomethyl cyanamide gave no kill of red spiders.

The compounds under study were formulated with clay to give dusts containing 5% of each of the compounds. These dusts were studied for their stomach poisoning action against army worm. With N-tert.-octyl-N-cyanomethyl cyanamide a kill of 83% was obtained; with N-3,5,5-trimethylhexyl-N-cyanomethyl cyanamide a kill of 97% was obtained. In tests with N-tert.-butyl-N-cyanomethyl cyanamide in an emulsion concentrate applied at 1:100 a kill of army worm of 13% was observed, this being too low a kill to be of significance. Under the same conditions N-n-octyl-N-cyanomethyl cyanamide gave a kill of only 10%. The critical balance of molecular arrangement is also shown by results of tests with the compound $C_9H_{19}N(CN)C(CH_3)_2CN$, where the nonyl group was 3,5,5-trimethylhexyl. A dust containing 10% of this compound gave no control of the bean aphid and only a 3% kill of army worm.

Against the Mexican bean bettle kills were obtained with emulsion concentrates as follows: with N-tert.-butyl-N-cyanomethyl cyanamide 53%; with N-n-octyl-N-cyanomethyl cyanamide 33%; with N-2-ethylhexyl-N-cyanomethyl cyanamide 70%; with N-tert.-octyl-N-cyanomethyl cyanamide 83%; and N-3,5,5-trimethylhexyl-N-cyanomethyl cyanamide 97%.

Rearrangement of the substituent groups in this type of molecule, although leading to a branched configuration, does not provide compounds of as marked insecticidal action as those of this invention. For example, the compound $CH_3N(CN)C(CH_3)(C_2H_5)CN$, applied at 1:400 against bean aphids gave no kill in 24 hours, while $C_4H_9N(CN)CH(CH_3)CN$ at 1:400 gave no kill of red spiders and at 1% from an emulsifiable concentrate gave a 30% kill of army worm and the compound $CH_3N(CN)CH[CH_2CH(CH_3)CH_2C(CH_3)_3]CN$ gave no kill of red spiders or army worm.

Insecticidal tests were made with various cyanamides against house flies by the Peet-Grady method. Solutions of the individual cyanamides at 2% were made in deodorized kerosene and were compared with the Official Test Insecticide (O. T. I.). This standard gave knockdowns of about 97% and kills varying from 30% to 55%. The kills obtained, if any, from the test solutions were evaluated against kills from the O. T. I. tests performed at the same time. No knockdown or kill was obtained from N-alkyl-N-cyanomethyl cyanamides having as alkyl groups methyl, n-butyl, or tert.-butyl. Rather surprisingly N-tert.-octyl-N-cyanomethyl cyanamide gave a knockdown of 99% and a kill of 98%, giving a value vs. O. T. I. of +43.

The tests showed that the particular value in fly sprays of the N-alkyl-N-cyanomethyl cyanamides having branched alkyl groups of seven to nine carbon atoms was as synergists for pyrethrins. In these tests there was used either a solution (A) containing 50 mg. of pyrethrins per 100 ml. or (B) a solution containing 25 mg. of pyrethrins. On average the former gave a 70% knockdown and a kill of 15–25%. The latter gave a knockdown of 55% and a kill of 0–12%. The test compounds were used at 1%. Comparisons were simultaneously made with the Official Test Insecticide. Results with solution A are summarized in Table I, while results with solution B are presented in Table II. The compounds are identified by their N-alkyl substituents. The symbol KD refers to the percentage of knock-down obtained, while in the column under O. T. I. there is given the increase or decrease of kill in comparison with the percentage kills obtained with the Official Test Insecticide under the same conditions.

*Table I*

STUDY OF SYNERGISM WITH SOLUTION A

| Compound | KD | Kill | ±OTI |
|---|---|---|---|
| methyl | 97 | 48 | −23 |
| n-butyl | 99 | 45 | −1 |
| tert.-butyl | 83 | 38 | +8 |

*Table II*

STUDY OF SYNERGISM WITH SOLUTION B

| Compound | KD | Kill | ±OTI |
|---|---|---|---|
| tert.-heptyl | 97 | 68 | +19 |
| n-octyl | 90 | 41 | −26 |
| 2-ethylhexyl | 97 | 68 | +19 |
| tert.-octyl | 98 | 86 | +21 |
| isononyl | 94 | 54 | +5 |
| tert.-nonyl | 95 | 79 | +30 |
| cyclohexyl | 74 | 47 | −2 |

The tert.-alkyl compounds are outstandingly effective.

A surprising difference between the branch-chained alkyl cyanomethyl cyanamides and the straight-chained isomers is the stability of the former in contrast to the instability of the latter. For example, tert.-heptylcyanomethyl cyanamide, tert.-octylcyanomethyl cyanamide, and tert.-nonoylcyanomethyl cyanamide were stored for a period of over six months without any evidence of deterioration. In contrast n-octylcyanomethyl cyanamide became dark and thickened considerably after one week.

We claim:

A process for controlling flies which comprises applying to the fly habitat a composition containing an insecticidal proportion between 0.25% and 5% of N-tert-octyl-N-cyanomethyl cyanamide.

References Cited in the file of this patent

UNITED STATES PATENTS

| | | |
|---|---|---|
| 2,249,135 | Hechenbleikner et al. | July 15, 1941 |
| 2,589,208 | Craig et al. | Mar. 18, 1952 |
| 2,675,383 | De Benneville | Apr. 13, 1954 |
| 2,743,291 | De Benneville | Apr. 24, 1956 |

FOREIGN PATENTS

| | | |
|---|---|---|
| 512,691 | Great Britain | Sept. 22, 1939 |

OTHER REFERENCES

Von Braun: Ber. Deut. Chem., vol. 40, pp. 3937–40 (1907).